United States Patent [19]

Williams

[11] Patent Number: 5,692,190

[45] Date of Patent: Nov. 25, 1997

[54] BIOS EMULATION OF A HARD FILE IMAGE AS A DISKETTE

[75] Inventor: Donald D. Williams, Boca Raton, Fla.

[73] Assignee: International Business Machines Corporation, Armonk, N.Y.

[21] Appl. No.: 313,709

[22] Filed: Sep. 27, 1994

[30] Foreign Application Priority Data

Mar. 31, 1994 [FR] France .................... 94 03861

[51] Int. Cl.$^6$ .................................... G06F 9/445
[52] U.S. Cl. .................................... 395/652
[58] Field of Search .................... 395/650, 700, 395/652

[56] References Cited

U.S. PATENT DOCUMENTS

| | | | |
|---|---|---|---|
| 5,018,095 | 5/1991 | Nissimov | 395/404 |
| 5,136,711 | 8/1992 | Hugard et al. | 395/700 |
| 5,418,918 | 5/1995 | Vander Kamp et al. | 395/700 |
| 5,432,935 | 7/1995 | Kato et al. | 395/700 |
| 5,459,867 | 10/1995 | Adams et al. | 395/700 |
| 5,475,845 | 12/1995 | Orton et al. | 395/700 |

*Primary Examiner*—Alvin E. Oberley
*Assistant Examiner*—John O. Chavis
*Attorney, Agent, or Firm*—Bernard D. Bogdon

[57] ABSTRACT

A personal computer is BIOS configured to boot from an installed CD-ROM having at least one bootable partition. To enable swapping of large amounts of data stored on the CD-ROM at the BIOS level after the initial boot, the DOS-BIOS interface is modified so that a CD-ROM emulated as a hard drive file will emulate a floppy diskette image, a medium permitted by the operating system to be changed following an initial boot.

7 Claims, 12 Drawing Sheets

BIOS EMULATION OF A HARD FILE IMAGE AS A DISKETTE

CROSS-REFERENCES TO RELATED APPLICATIONS

The subject matter presented herein relates to inventions described in the following patent documents, all filed on even date and under common ownership herewith: Williams et al., BIOS DYNAMIC EMULATION OF MULTIPLE DISKETTES FROM A SINGLE MEDIA, U.S. Ser. No. 08/313,710; Williams, DATA PROCESSOR HAVING BIOS DECRYPTION OF EMULATED MEDIA IMAGES, U.S. Ser. No. 08/312,798; and Williams et al., BIOS EMULATION PARAMETER PRESERVATION ACROSS COMPUTER BOOTSTRAPPING, U.S. Ser. No. 08/312,149. Notice: © Copyright, International Business Machines Corporation 1994: A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

BACKGROUND OF THE INVENTION

1. Field of the Invention

This invention relates generally to the bootstrapping sequence of a data processing system, such as a personal computer, and more particularly, to booting from a CD-ROM.

2. Description of Related Art and Basis for Invention

All computers, such as the various models of personal computers, or PC's, produced by IBM Corporation, execute "operating system software" that instructs the PC on how to use other programs, termed "application software," such as word processing and spreadsheet programs. Examples of PC operating systems include MS-DOS and WINDOWS, manufactured by Microsoft Corporation, and IBM's OS/2.

Before a PC can run an operating system, it must load the operating system from a disk to the PC's working memory which is ordinarily random access semiconductor memory (RAM). This is carried out through a process known as "bootstrapping," or more simply, "booting" the PC. Booting occurs automatically when the PC is first turned on by a process called a "cold boot," or by the user while the computer is running ("warm boot").

Bootstrapping performs only two functions, the first being to run a power-on self-test, or POST, and the other to search the storage media (floppy diskette or hard disk) for the operating system it will load. These functions are controlled by firmware stored in one or more basic input-output system, or BIOS, chips inside the PC.

The POST initializes all the internal hardware and hardware connected to the PC known to it, such as memory, and tests and places the hardware in an operational state. The BIOS program then normally checks drive A of the PC to determine if it contains a formatted floppy disk. If a disk is mounted in the drive, the program searches specific locations on the disk to determine if a valid boot record exists. If the floppy drive is empty, the boot program checks the hard drive C for the system files. In the absence of these files, the BIOS will generate an error message.

After locating a disk with a valid boot record, the BIOS program reads the data stored on the first sector of the disk, and copies that data to specific locations in RAM. This information, found in the same location on every formatted disk, constitutes the DOS boot record. The BIOS then passes control to the boot record which instructs the PC on how to load the two hidden operating system files to RAM (the files named IBMBIO.COM and IBMDOS.COM on IBM computers). After loading other operating system files into RAM to carry out the rest of the boot up sequence, the boot record is no longer needed.

The root directory of the boot disk is next searched for a file created by the user (CONFIG.SYS) and which contains commands instructing the operating system how to handle certain operations such as how many files may be opened at a time, and so-called device drivers which describe the existence and characteristics of hardware devices not recognized by BIOS that may be connected to the PC.

Next loaded from the boot disk into RAM is the file COMMAND.COM which is an operating system file containing, among other functions, fundamental DOS commands used throughout application program execution, and a file named AUTOEXEC.BAT created by the user and containing a series of DOS batch file commands or program names to be executed by the PC each time the computer is turned on. This completes the boot up sequence, and at this point the computer is considered fully booted and ready to be used.

The usual types of storage media, in order of storage density, are floppy disk and hard disk storage, which are magnetic media, and more recently, CD-ROM which is an optical medium capable of storing a considerable amount of data. A CD-ROM is a "read only" medium, although magneto-optical media, capable of being written to as well as read from, are emerging. Presently, floppy disks are 5.25 or 3.5 inches in diameter, with smaller sizes now emerging, and are capable of storing up to 2.88 megabytes of data. Hard disks store considerably more data, currently in the range of up to 2 gigabits, arranged as clusters disbursed throughout the medium.

CD-ROM's have attributes of both hard disks and floppy diskettes, that is, they have the storage capacity of a hard drive and the replaceability of a diskette. CD-ROM technology currently is capable of storing more than 600 megabytes of read-only data along a continuous spiral track on a phonograph record-like optical medium. As with other disk media, the CD divides its capacity into short segments, or "large frames" for addressing. The number of such large frames varies but can reach about 315,000, each containing 2352 bytes under a defined media standard. Most of the frame contains data and the remainder is divided among a synchronization field, sector address tag field and an auxiliary field. Data stored on the CD-ROM is formatted as sectors of data comprising 800 h bytes each, and with boot record residing at a prescribed (11 h) sector in the last session on the CD. The boot record points to a boot catalog providing descriptions and locations of disk or diskette image emulations recorded on the CD-ROM, one or more of which may be bootable and may carry an operating system.

Figure 1:
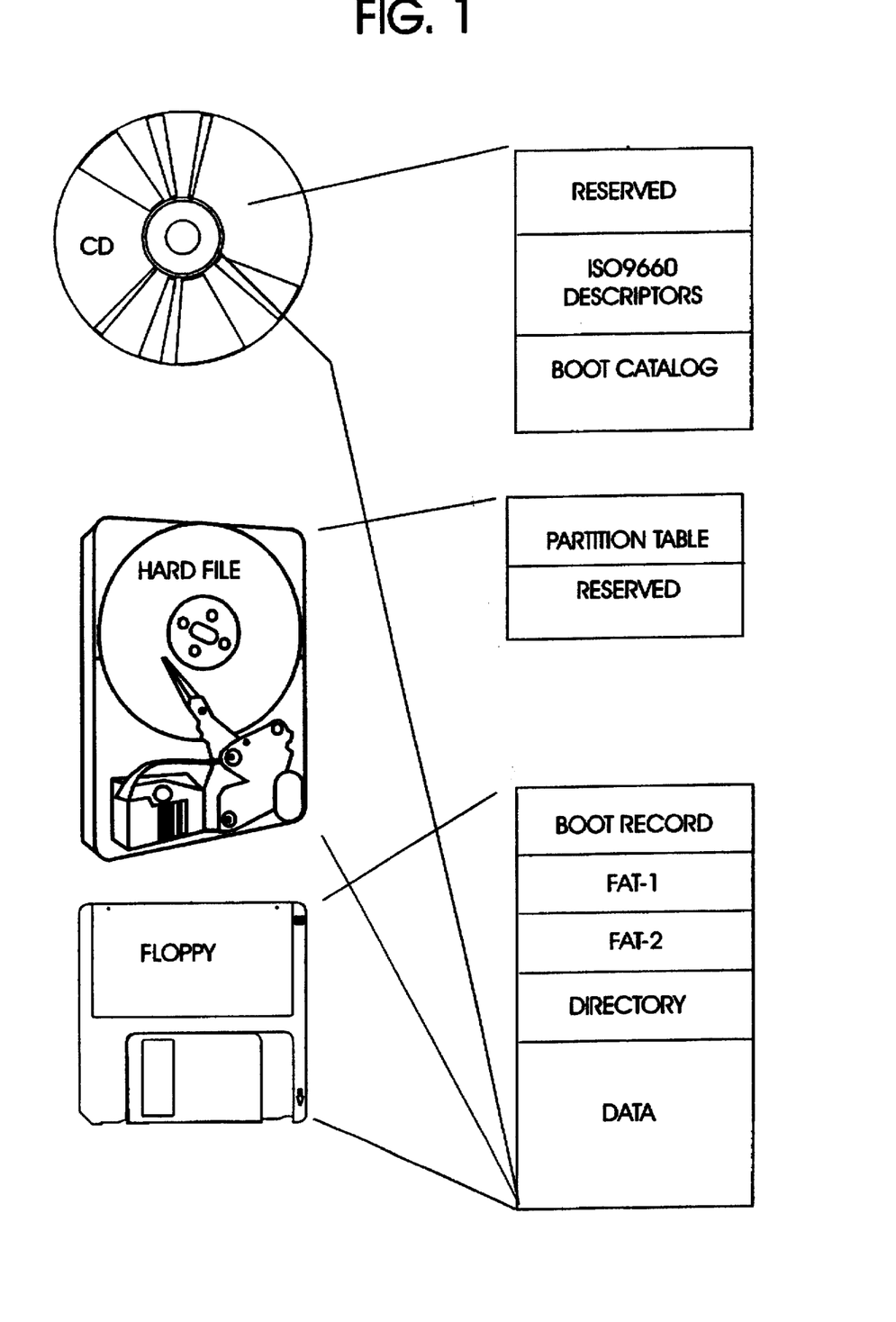
FIG. 1 is a diagram showing image formats of diskette, hard drive and CD-ROM storage media.

Image formats of these three types of media are hierarchical in structure, with diskette lowest and CD-ROM highest, and each medium adding regions of storage overlying the storage regions of the medium beneath it. Referring to FIG. 1, which depicts the image formats of the three media, a floppy diskette starts with a boot record, which is a short program loading the operating system into the main memory, followed by a pair of file allocation tables (FAT's) which record the file structure of the diskette (two FAT's are often provided, as shown, to perform an integrity check on stored files). Next is a root directory which records the files stored on the diskette, and finally the data storage region.

The structure of a fixed disk includes not only the same regions as found in a diskette, but begins with a reserved region as well as a partition table which, as the first record on the disk, defines the operating boundaries constituting the logical partitions of the disk, if the disk is partitioned by the user. The hard file may contain multiple "floppy images."

A CD-ROM adds to that a table of descriptors, such as defined by ISO 9660, as the first record on the CD. How data is organized into files stored on a CD-ROM is designated by the ISO 9660 specification, which specifies, among other things, that a "Primary Volume Descriptor" must reside at sector 10 h relative to the start of a session, followed by any number of other Volume Descriptors, and then by a "Volume Descriptor Terminator." The boot catalog, following the ISO descriptors, is a directory pointing to the stored images files identifying image characteristics. Incorporation by reference is made herein to the ISO 9660 specification in its entirety. A CD may contain multiple "hard file" and/or "floppy images."

The ISO 9660 specification provides, optionally, new boot capabilities for personal computers, a concept expanded upon in the "El Torito" bootable CD-ROM format specification, Version 1.0, recently jointly developed and made publically available by Phoenix Technologies and IBM Corporation, the assignee of the present invention. This El Torito specification, incorporated herein by reference, describes how the BIOS boot procedure can be enhanced in accordance with the principals of the present invention to support the CD-ROM using INT 13 calling conventions for enabling the CD-ROM to boot as the A drive or C drive without device drivers. In accordance with this El Torito specification, if the user selects one of the boot CD-ROM options on a setup menu, and during POST the BIOS detects the presence of a CD-ROM drive, INT 19 at the end of POST will attempt to load the operating system using the boot sequence specified in Setup. To accomplish this, the installable boot CD-ROM feature makes available one of two INT 19 functions, namely, single image and multiple image INT 19.

The single image INT 19 feature accesses the booting catalog in the CD-ROM header, verifies the existence of a boot image on the CD-ROM and reads the initial/default entry and then boots from the disk image specified in this entry. Multiple image INT 19, if instructed to boot from the CD-ROM, accesses the booting catalog, verifies, and then boots from either the image specified in the initial default entry or from one of the other images listed in the section headers and section entries that follow the initial/default entry.

Figure 2A:
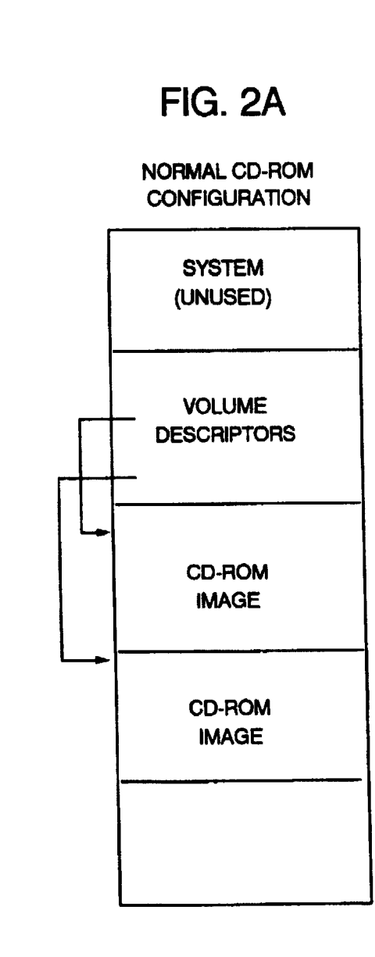
FIGS. 2(a)-2(c) are diagrams showing configurations of non-bootable CD-ROM, single boot image CD-ROM and multiple boot image CD-ROM, respectively.
Figure 2B:
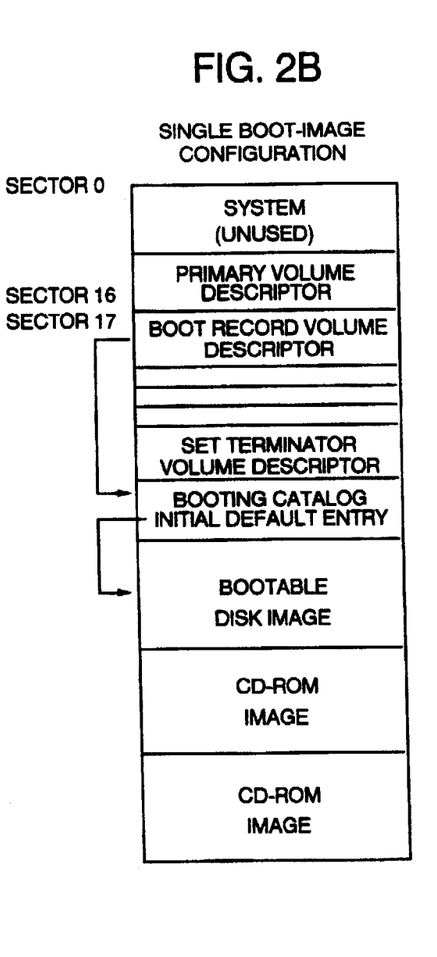
Figure 2C:
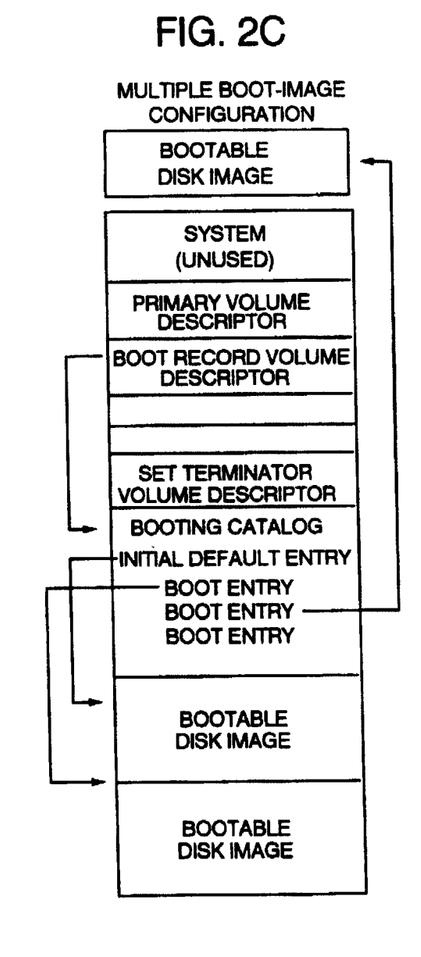

Three types of CD-ROM configuration are shown in FIGS. 2(a)–2(c). In FIG. 2(a), the normal CD-ROM configuration is not bootable; it uses root directory and CD-ROM drivers to access CD-ROM images. In FIG. 2(b), a BIOS with a single boot image capability accesses the initial/default entry to access a single bootable disk image. After loading the operating system, the system can revert to standard CD-ROM drivers and the root directory to access CD-ROM images. In FIG. 2(c), a BIOS with multiple boot-image capability can access any one of a number of bootable disk images listed in the booting catalog. After loading the operating system, the system can access other items in the disk image with standard INT 13 calls or return to normal access of CD-ROM images using CD-ROM drivers and the root directory.

Figure 5:
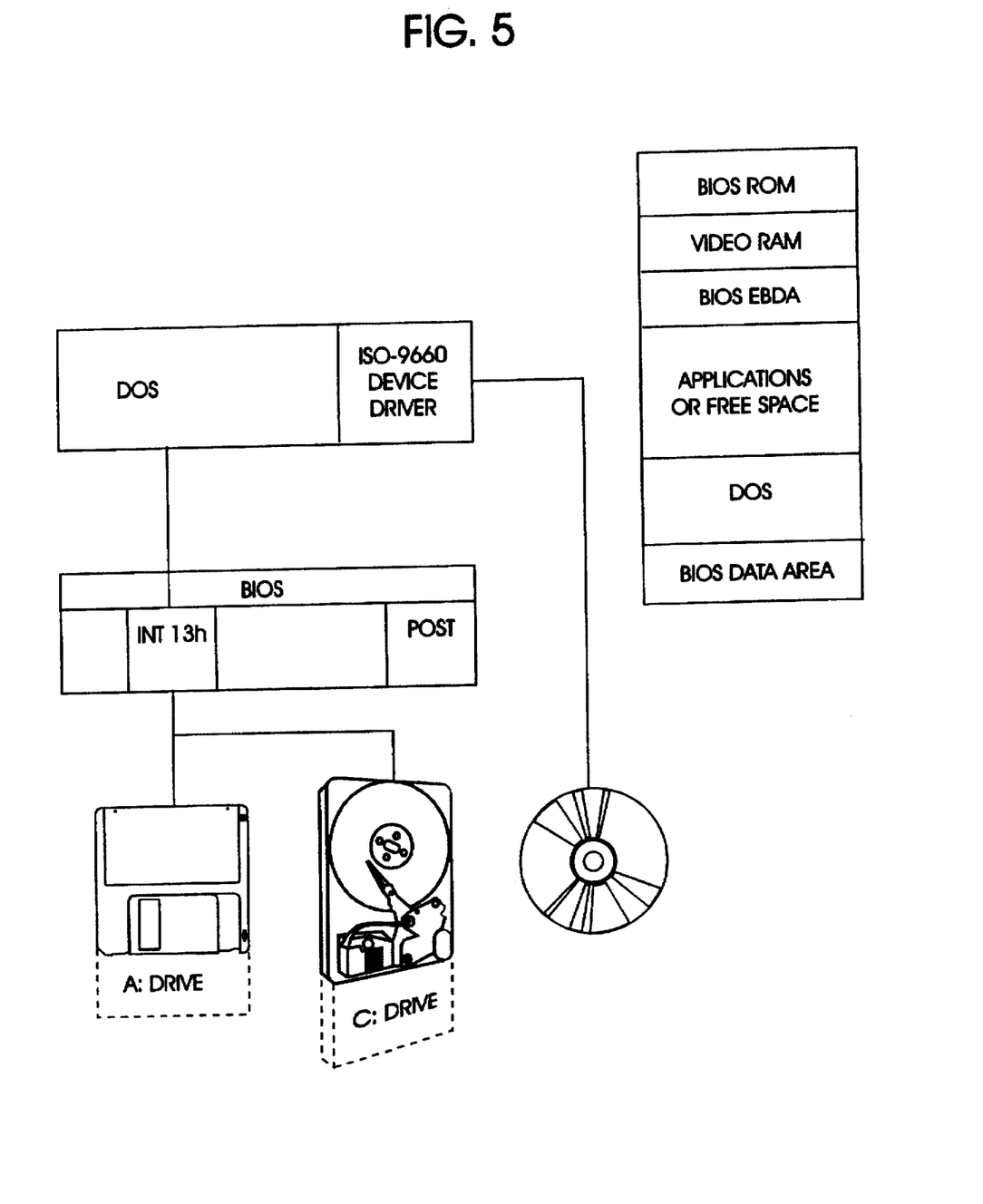
FIG. 5 is a diagram of the ISO-9660 operating environment upon which the invention is optionally based.

The ISO 9660 device driver operating environment is depicted in FIG. 5, wherein the right hand side is a map of the first 1M of random access main memory. The lowest address of the main memory is occupied by BIOS data, such as interrupt vectors and other machine specific operating parameters such as identification of drives and access to them through BIOS INT 13 functions. The next region of memory is occupied by the operating system, such as DOS, followed by an extended BIOS area, or BIOS EBDA entered during booting. Residing in the upper layers of the main memory are video data and firmware based BIOS which is fixed for all applications. The usual BIOS functions do not recognize a CD-ROM drive, which is instead defined by ISO-9660 device driver software residing in the operating system, as shown in FIG. 5.

Figure 6:
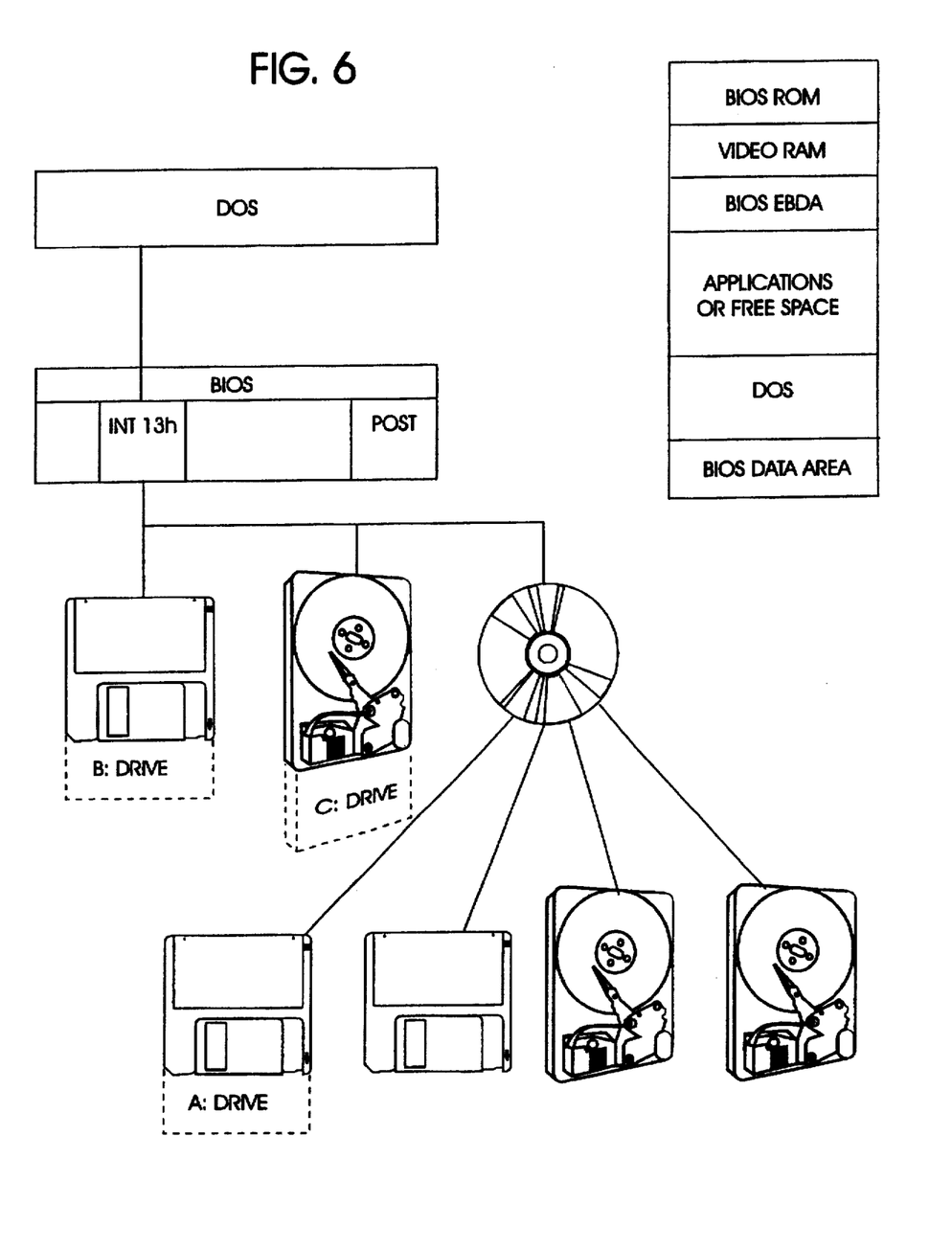
FIG. 6 is a default CD boot diagram showing BIOS implementation of multiple CD-ROM image emulation per the El Torito specification.

In FIG. 6, in accordance with the principles of the present invention and the El Torito specification, enhancements made to BIOS EBDA enable the INT 13 calls to recognize the CD-ROM and further to provide for hard disk and floppy diskette image emulations derived from the CD-ROM storage files, that is, to treat the emulation images as if they are physical hard disk or floppy drives. In this example, the CD-ROM image which is booted becomes the A (floppy diskette) drive, and the physical A drive is renamed as drive B (A: becomes B; Floppy 1.IMB becomes A; DOS and application load from emulated A).

An important advantage of bootable CD-ROM's in accordance with the El Torito specification is the capability of distributing multiple applications on a single medium. Multiple versions of the same application in different languages can also be distributed; the user simply boots the CD-ROM and then selects the operation system, application set, and/or language to install.

The presently described invention and those described in the copending applications provide, among other things, enhancements to the BIOS to support booting from a CD-ROM while maintaining compatibility to prescribed standards, such as the ISO 9660 specification. Particular booting options and formats are described in the above-identified copending applications, incorporated herein by reference.

In certain applications, it sometimes becomes necessary to swap large amounts of data storage, as by replacing one storage medium with another. This can be carried out in conventional practice by exchanging floppy disks but not hard files which are non-replaceable media. Furthermore, at the BIOS level, DOS can accommodate swapping of diskettes, but does not recognize changing a hard file medium or its operating geometry. Hence, BIOS emulation of hard file images is not amenable to media swapping. Above the BIOS level, device drivers allow media changes, but attempting to use BIOS-based drivers to perform this function creates a number of problems such as resource conflicts and inordinate use of memory.

The present invention introduces a technique for swapping storage media on a CD-ROM, after initial boot, which emulates relatively large hard file images as removable media by BIOS.

SUMMARY OF THE INVENTION

The invention provides a data processing system comprising a central processing unit (CPU), a system memory for storing data in the form of electrical signals, a first port for receiving an input device generating electrical input signals, and at least one second port for supplying electrical output signals to output devices. The CPU is of a type including a BIOS for carrying out prescribed functions including converting operating signals developed by an operating system executed by the CPU into electrical signals compatible with devices that are responsive to signals provided by the CPU to the system bus. The data processing system further includes a drive for a non-volatile mass storage medium, such as a CD-ROM, storing multiple emulated drive images, at least some of them being bootable, and a system bus interconnecting the CPU, system memory, first and second ports and mass storage medium driver.

In accordance with an important aspect of the invention, the BIOS includes programming to emulate a hard file image as a diskette image. In the preferred embodiment, operating in a DOS environment, the BIOS programming offsets a Logical Block Address to point to the Partition Boot Record corresponding to the starting sector of the first hard file partition, modifies the partition boot sector to force the operating system to refresh the physical parameters of the emulated image, sets the number of hidden sectors in the BIOS parameter block to zero corresponding to that of a diskette, sets the IPL (Initial Program Load) drive in the BIOS Parameter Block to an emulated drive identification, and sets the IPL head in the BIOS Parameter Block to 00.

Numerous advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF THE ILLUSTRATIVE EMBODIMENT(S)

Figure 3:
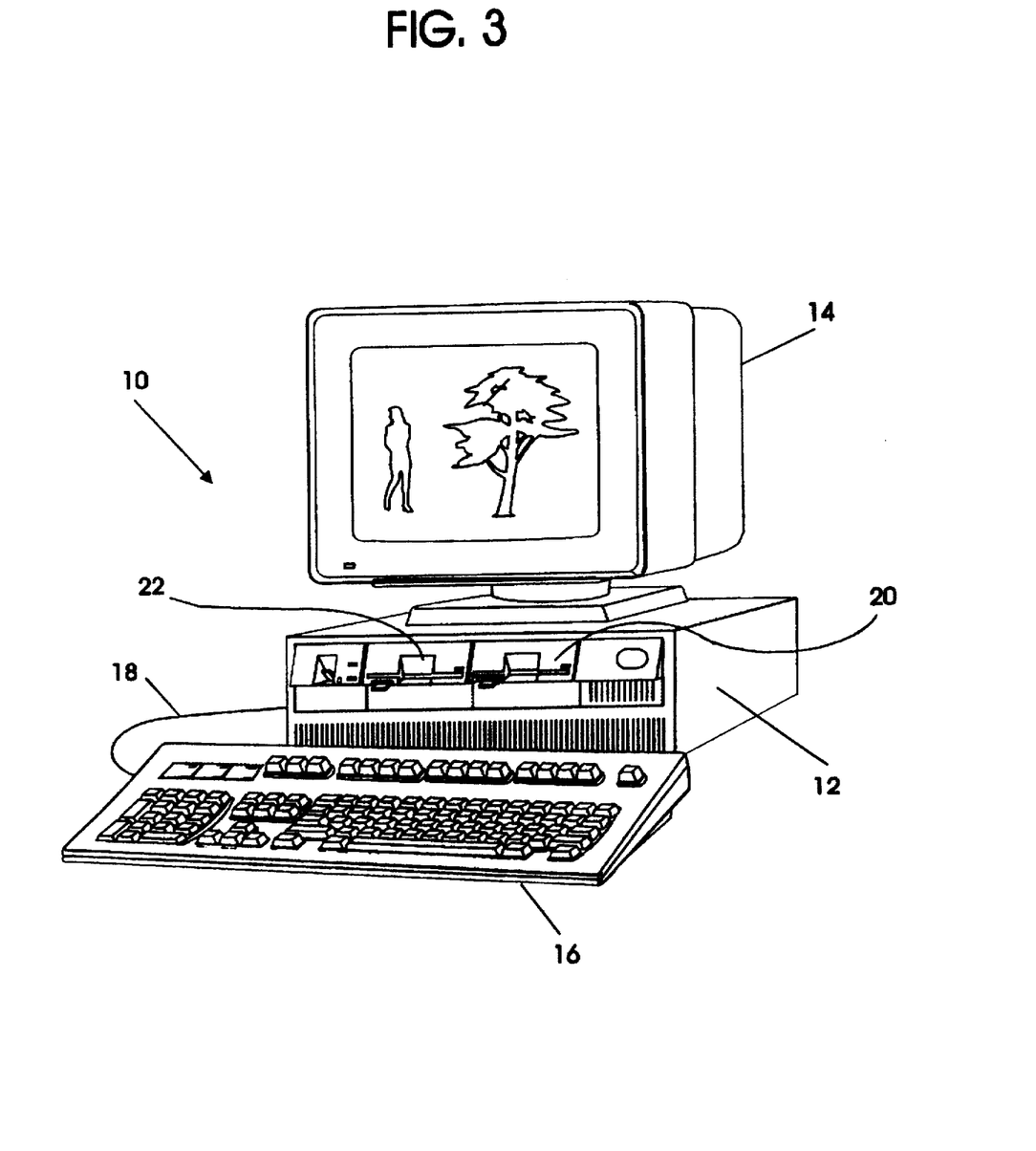
FIG. 3 is a perspective view of a personal computer system within which the present invention has application.

With reference now to the Figures, and in particular with reference to FIG. 3, a personal computer, or PC, designated 10 is of the environment to which the invention has particular utility. The computer 10 which preferably, but not necessarily, is of a type utilizing an IBM Personal Computer 2 or similar system, includes a console housing 12 within which circuit boards containing the necessary circuitry including microprocessor and BIOS chips, controllers, random access memory and other hardware are arranged. The computer will also include a video display 14 and a keyboard 16 connected into the housing 12 through cable 18. Mass storage media include a hard drive within the housing and not accessible to the user, and user accessible floppy disk and CD-ROM drives 20 and 21.

Figure 4:
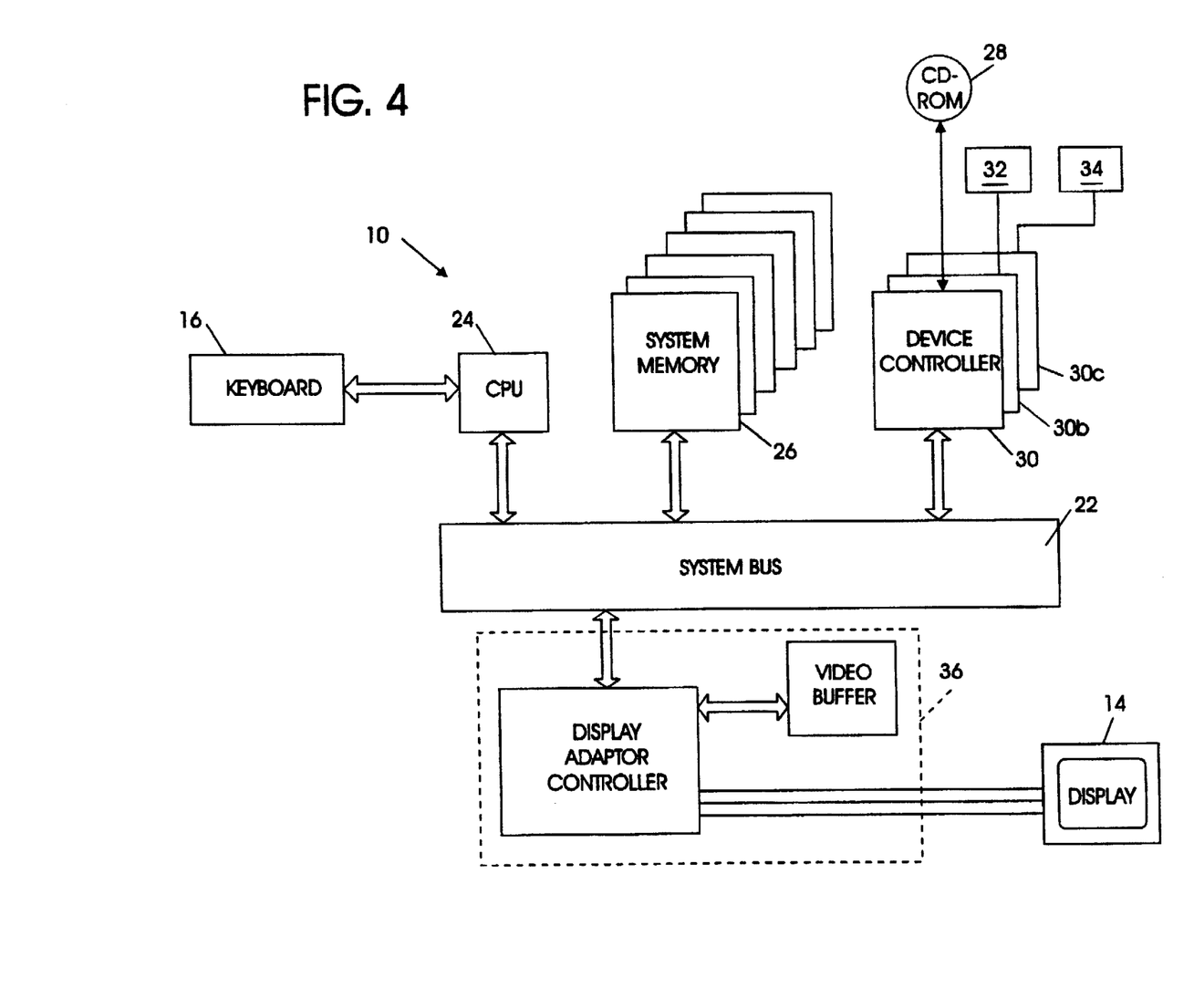
FIG. 4 is a block diagram of a personal computer based data processing system within which the invention may reside.

The architecture of computer system 10, depicted in FIG. 4, is based on a system bus 22 on which data is passed between components of the computer, including a central processing unit (CPU) 24 which preferably is based on one of the "486" family or more powerful types of processors, manufactured by Intel Corporation or others, executes programs stored in main or system memory 26 and manipulates data stored in the same memory. Data, including multimedia, may be stored in CD-ROM 28 and accessed by CPU 24 per ISO 9660 specifications through a device controller 30 connected to system bus 22. Other data are stored in floppy and hard disk drives 32 and 34 for accessing by the CPU 24 through corresponding controllers 30b and 30c. Display 14 is connected to the system bus 22 through a video controller 36.

Preferably, the CD-ROM is bootable, as described previously, and in the invention is formatted in accordance with the El Torito bootable CD-ROM format specification. The bootable CD-ROM format incorporated by the invention maintains compatibility with ISO-9660 while providing BIOS with a means of finding the location on the CD that contains the material to be booted. The before mentioned El Torito bootable CD-ROM format is detailed in an appendix hereto (APPENDIX).

Figure 7:
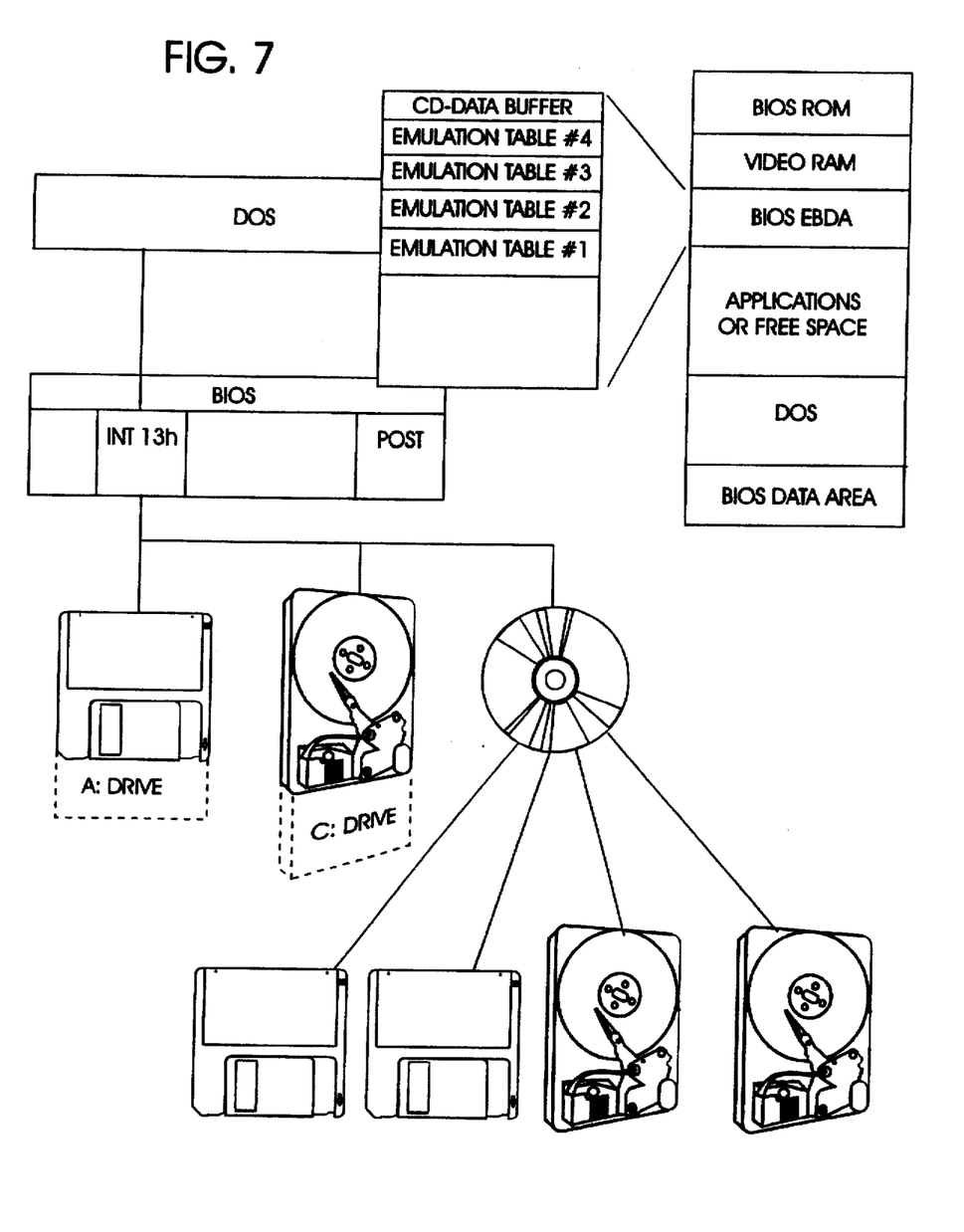
FIG. 7 is a diagram showing multiple emulation tables residing in BIOS EBDA in accordance with an aspect of the invention.

With reference to FIG. 7, multiple emulation CD-ROM images are made available to the user through multiple emulation tables added, in accordance with the invention, to the BIOS EBDA, four being illustrated in the present example of FIG. 7. Each of these tables is dynamically associated with a logical drive letter. The table provides the translation necessary to map the logical drive to a selected image on the medium. An example of a device table, which resides in the BIOS Parameter Block (BPB), is as follows:

| SpSize | db | ? | ;set if table active |
|---|---|---|---|
| SpMediaType | db | ? | |
| SpDrive | db | ? | ;logical drive |
| SpController | db | ? | |
| SpLba | dd | ? | ;physical location on medium |
| SpLun | db | ? | |
| SpBus | db | ? | |
| SpCacheSegment | dw | ? | |
| SpLoadSegment | dw | ? | |
| SpLoadCount | dw | ? | |
| SpCylinder | db | ? | ;physical mapping information |
| SpSector | db | ? | |
| SpHead | db | ? | |
| TotalSectors | dd | ? | |
| SectCylinder | dw | ? | |

-continued

| | | | |
|---|---|---|---|
| MediaChange | db | ? | ;set if medium has changed |
| LockCount | db | ? | ;logical media lock |
| BootOffset | dw | ? | ;location of boot sector |
| | dw | ? | ;contains cipher key | wherein the "Sp" prefix designates "specification," db, dw and dd represent byte, word and double word, respectively, and a "?" indicates a reservation in main memory.

Figure 8:
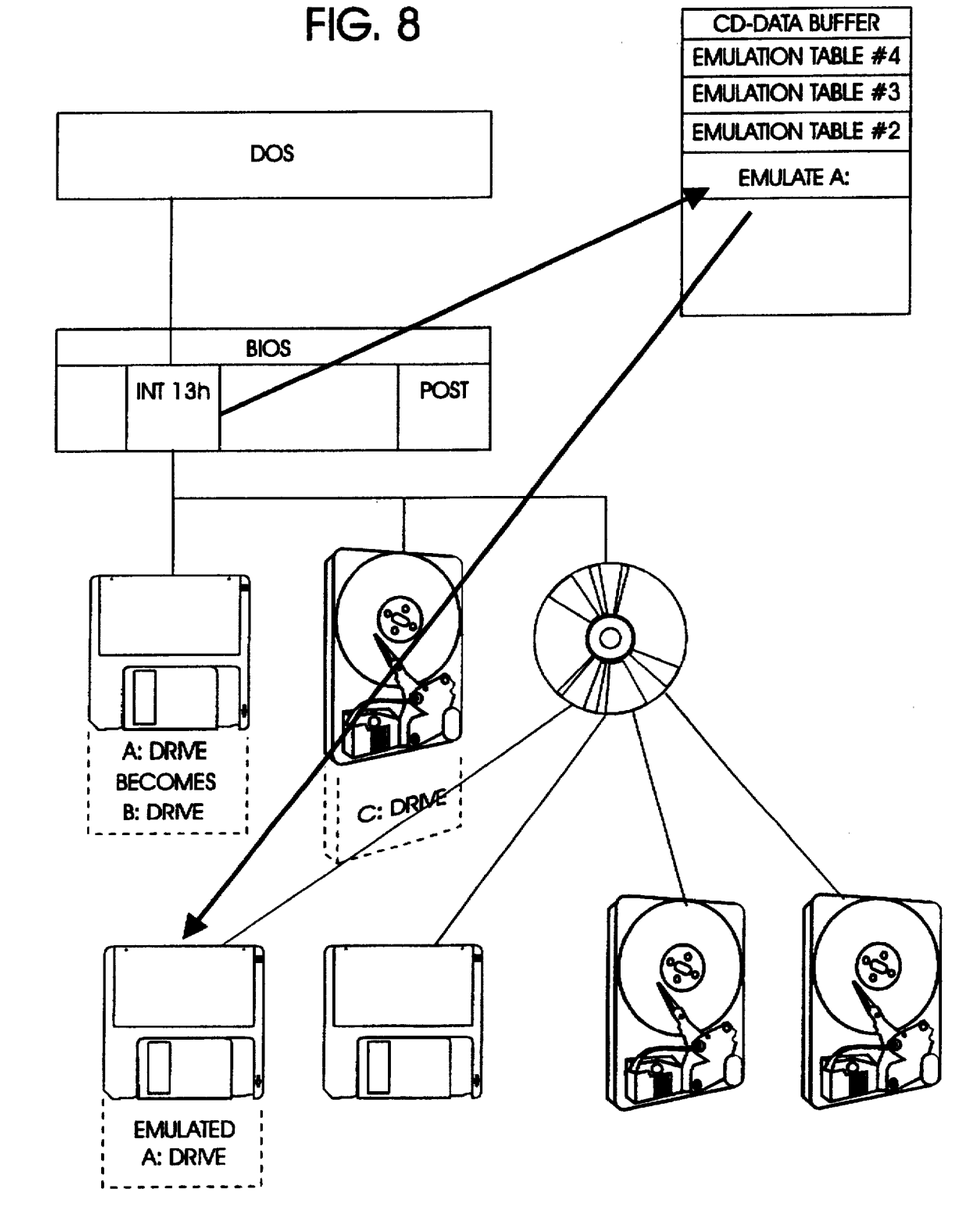
FIG. 8 shows emulation of a CD-ROM image by table activation.
Figure 10:
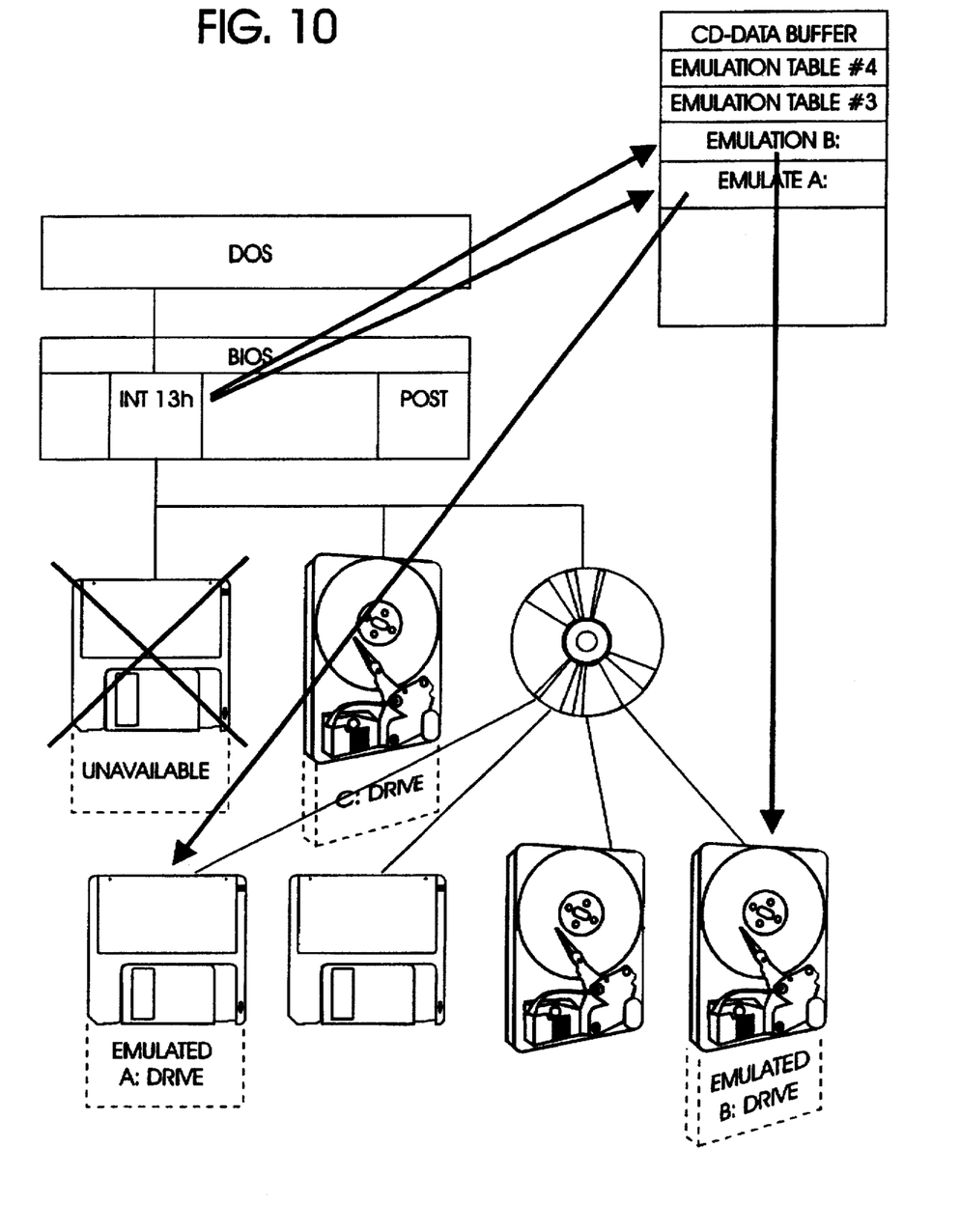
FIG. 10 shows multiple table activation to emulate two drives simultaneously as provided by the present invention.

Each table describes all the characteristics of a CD-ROM image to be emulated, such as size, media type, and format entities peculiar to hard drive and diskette media. The final entry in the table is a cipher key used in conjunction with file decryption at BIOS level, as described in copending application Ser. No. 08/312,748 entitled DATA PROCESSOR HAVING BIOS DECRYPTION OF EMULATED MEDIA IMAGES. BIOS, by activating any table per the El-Torito specification (describing only single emulation table implementation) INT 13 Function 4A, can determine which drive is being emulated, and where on the CD-ROM the emulation is to be found. With reference to FIG. 8, emulation of drive A is initiated by activation of the corresponding table by a BIOS call through INT 13, when, as mentioned previously, the physical A drive becomes renamed as the B drive, the A drive having been replaced by the emulation. With the A drive emulation remaining active, the BIOS table for emulation B, as seen in FIG. 10, is next activated, so that both drive images remain accessible to the user at the same time, without requiring a reboot. In this case a hard drive image emulation replaces the physical B drive which becomes unusable.

Figure 9:
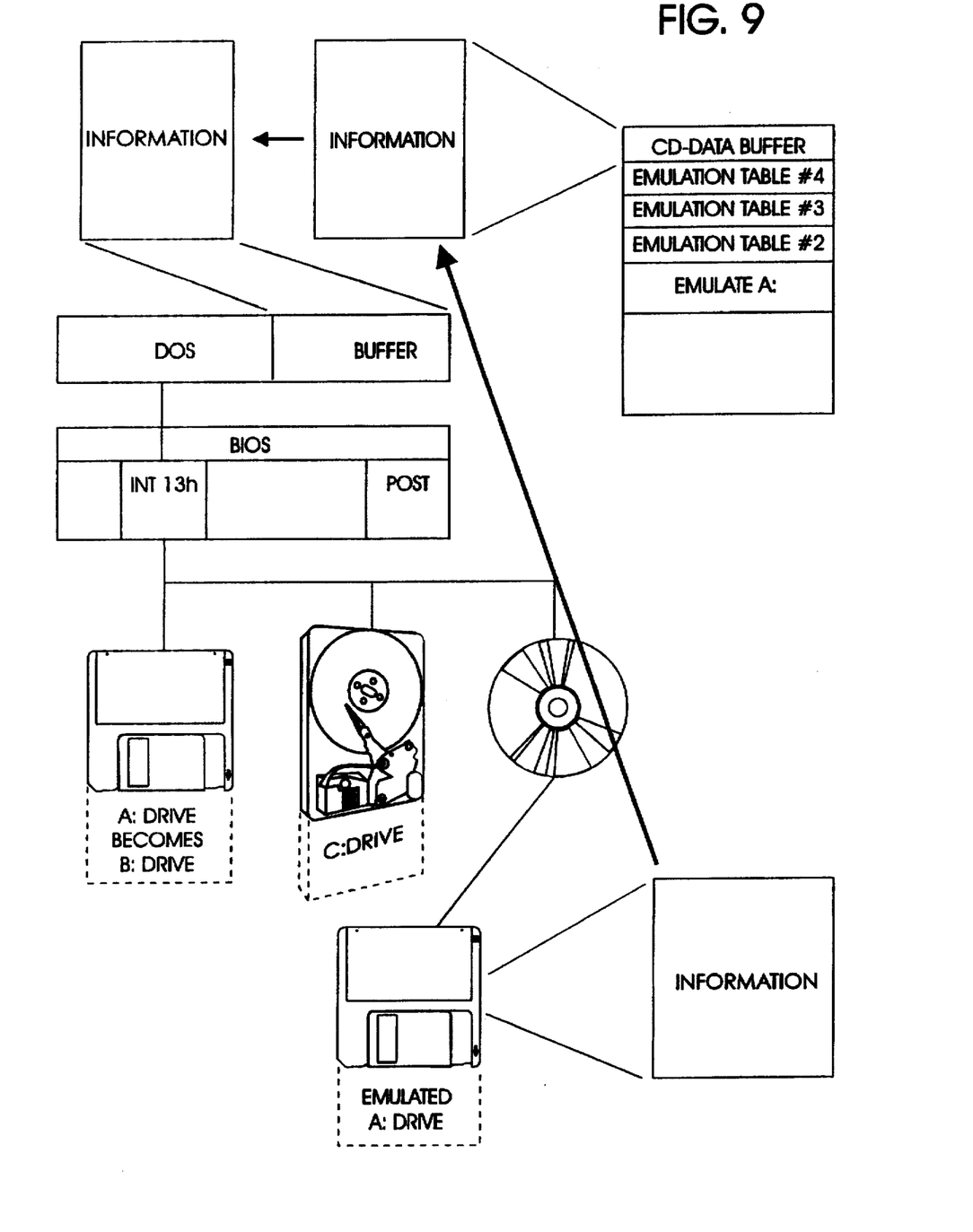
FIG. 9 is a diagram showing flow of data during CD emulation of drive A.

Data flow under this condition is as follows. Referring to FIG. 9, assume that file data is being read from an emulated A drive on the CD-ROM and that the physical A drive is renamed as the B drive, as described previously. The data is sent to the CD data buffer within the BIOS EBDA, and from there transferred to a buffer within the operating system, in this example, DOS. Other buffers may also contain data read from the other emulations, as shown in FIG. 10 and described in the copending application to Williams et al. entitled BIOS DYNAMIC EMULATION OF MULTIPLE DISKETTES FROM A SINGLE MEDIA, Ser. No. 08/313,710.

As noted earlier, in certain applications, it is necessary to swap large amounts of data storage, as by replacing one storage medium with another. The present invention introduces a technique for swapping storage media on a CD-ROM, after initial boot, which emulates hard file images as removable media by BIOS so that DOS "believes" it is accessing a floppy diskette emulation whereas it actually is accessing a larger fixed disk emulation. More particularly, in accordance with the preferred embodiment, to combine the attributes of large storage capacity of hard files with replaceability of floppy diskettes, the invention changes those parameters residing in the BIOS Parameter Block (BPB) within the BIOS EBDA which emulate hard files, to parameters which emulate a floppy.

Figure 11:
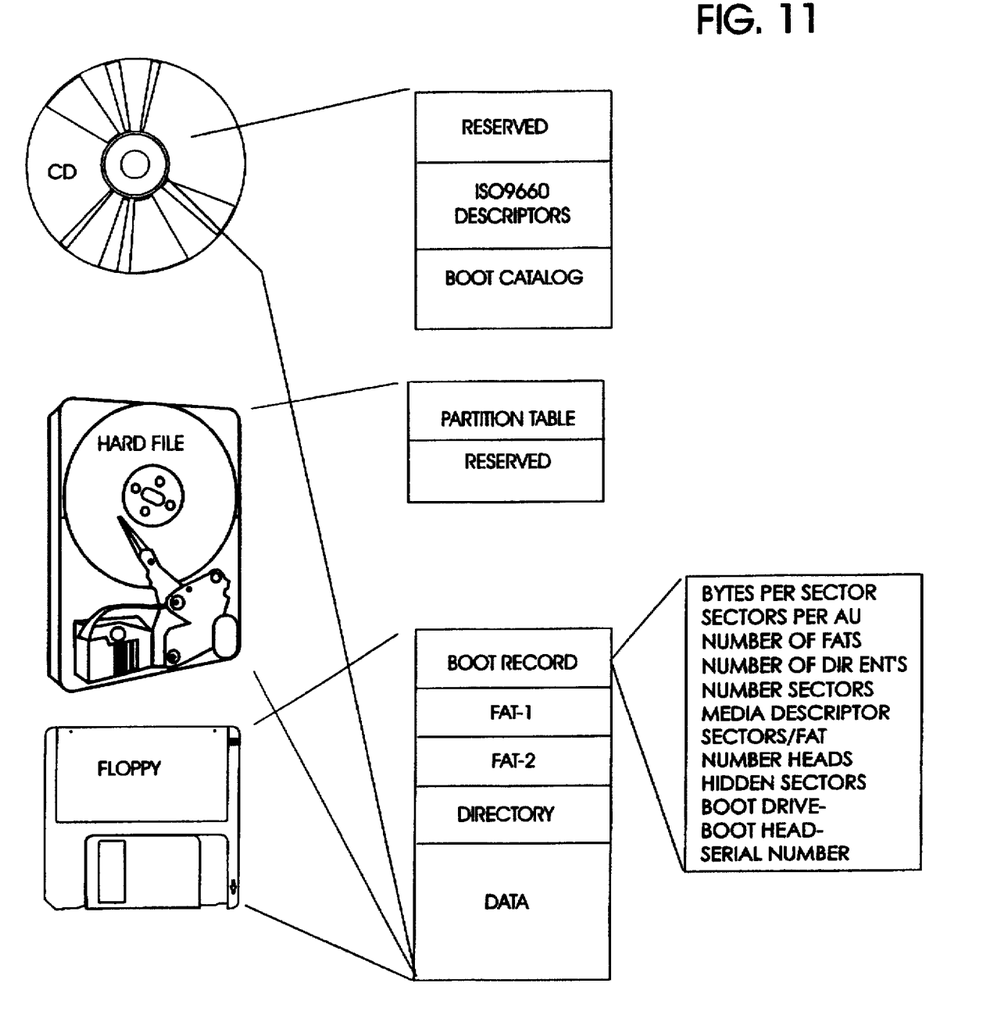
FIG. 11 is a diagram showing the content of the BIOS parameter block with parameters that must be changed to present a hard file image as a floppy diskette image.

Hard file images normally have more heads and more sectors per track than diskette images. A hard file image also contains a Master Boot Record as well as one or more Partition Boot Records. The Master Boot Record in turn contains a disk partition table. Referring to FIG. 11, the BPB within the boot record contains the following emulation parameters: Bytes per sector, sectors per AU, number of FATs, number of root directory entries, number of sectors, media descriptor, sections/FAT, number of heads, boot drive, boot head and serial number.

Figure 12:
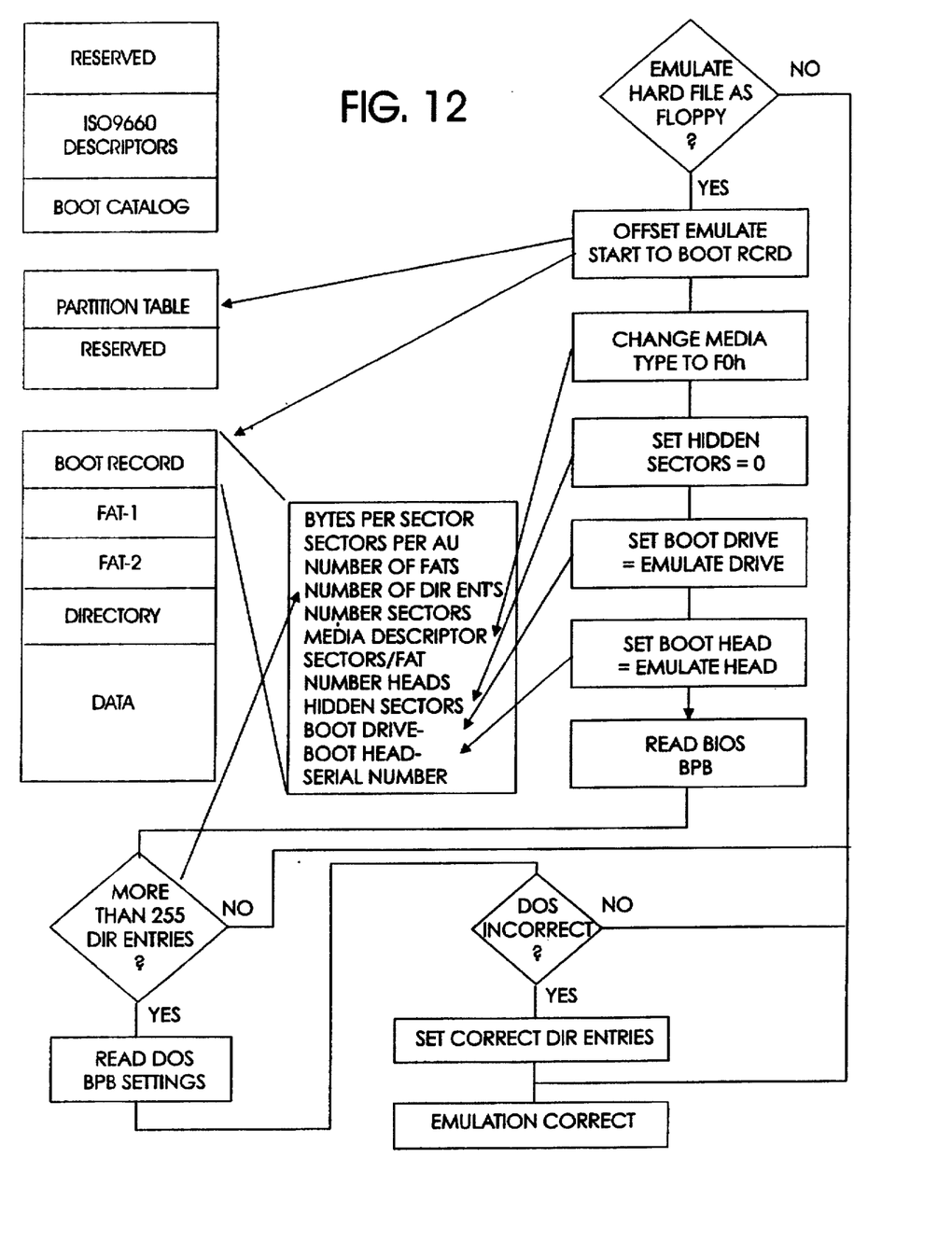
FIG. 12 is a flow chart showing a boot sequence which emulates a hard file as a floppy diskette file, in accordance with the invention.

In accordance with the invention, and with reference to FIG. 12, to select a hard file image as a diskette image, the following changes are performed.

1. The base Logical Block Address (LBA) is offset to point to the Partition Boot Record. This is the starting sector of the first hard file partition.

2. The media type in the BIOS Parameter Block (BPB) of the partition boot sector is changed to 0F0h. This is necessary to force DOS to refresh the physical parameters of the emulated image.

3. The number of hidden sectors in the BPB is set to zero. With a hard file image, this value represents the number of sectors that precede the partition. With a diskette, it is always zero.

4. The IPL drive in the BPB (normally 80 h) is set to the emulated drive ID.

5. The IPL head in the BPB is set to 00.

If the diskette emulation image contains more than 255 (0FFh) directory entries, DOS may not properly process it. To verify and/or property process that image, the I/O Control for Devices (IOCTL) DOS command is used to acquire and then set the control device operating parameters. To determine the number of sectors actually allocated for the directory, BIOS Read Sectors should be read:

| | | |
|---|---|---|
| MOV | AH,2 | ;Read sectors |
| MOV | AL,1 | ;Read 1 sector |
| MOV | CH,0 | ;Cylinder 0 |
| MOV | CL,1 | ;Sector 1 |
| MOV | DH,0 | ;Head 0 |
| MOV | DL,0 | ;Drive ID 0=A, 1=B, etc. |
| MOV | ES,SEG BUFFER | ;ES:BX point to buffer |
| MOV | BX,OFFSET BUFFER | |
| INT | 13h | |
| JC | ERROR | |
| BUFFER | 512 DUP(?) | |

The number of root directory entries is a word at buffer offset 17 (11 h). If this word is greater than 255 (0ffh), the value used by DOS may need to be corrected.

To obtain the DOS setting, the following program may be used:

| | | |
|---|---|---|
| MOV | AH,44h | ;IOCTL FUNCTION CALL |
| MOV | AL,0Dh | ;Generic block device |
| MOV | BL,0 | ;Drive ID 0=A, 1=B, etc. |
| MOV | CH,8 | ;Block device |
| MOV | CL,60h | ;Get device parameters |
| MOV | DS,SEG PACKET | ;DS:DX point to packet |
| MOV | DX,OFFSET PACKET | |
| INT | 21h | |
| JC | ERROR | |
| PACKET | DB 1,511 DUP(?) | |

The first byte of PACKET must be set to 1 to return the BPB for the device. Enough space for the return data, e.g., 512 bytes, should be used.

PACKET offset 13 (0Dh) contains the number of directory entries (word). If necessary, this value should be corrected and the following used to return it to DOS:

| | | |
|---|---|---|
| MOV | AH,44h | ;IOCTL Function Call |
| MOV | AL,0Dh | ;Generic block device |
| MOV | BL,0 | ;Drive ID 0=A,1=B, etc. |
| MOV | CH,8 | ;Block device |

-continued

```
MOV   CL,40h              ;Set device parameters (=
MOV   DS,SEG PACKET       ;DS:DX point to packet
MOV   DX,OFFSET PACKET
INT   21h
JC    ERROR
```

Those parameters in BPB that are changed for hard file emulation as a diskette are identified in FIGS. 11 and 12 by an asterisk (*).

Thus, in accordance with the invention, a CD-ROM emulated as a hard file image will emulate a floppy diskette so as to enable the medium to be swapped by, in essence, forcing the DOS BIOS interface to consider a hard file as a floppy. Boot sector information is dynamically modified, and the physical location of file information logically remapped.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A data processing system, comprising:
    a central processing unit (CPU);
    a system memory for storing data in the form of electrical signals;
    a first port for receiving an input device generating electrical input signals;
    at least one second port for supplying electrical output signals to output devices;
    a system bus interconnecting the CPU, the system memory, the first port and the at least one second port;
    a BIOS for carrying out prescribed functions including converting operating signals developed by an operating system executed by the CPU into electrical signals compatible with devices that are responsive to other signals applied by the CPU to the system bus;
    a drive for a non-volatile mass storage medium, connected to the system bus, storing multiple independent applications in the form of data on respective BIOS emulated images; and
    the BIOS includes programming to emulate a hard file image as a diskette image including a starting sector of a first hard file partition as a Partition Boot Record including a BIOS Parameter Block having physical parameters including a partition boot sector, hidden sectors, an IPL drive and an IPL head, wherein the BIOS programming:
        offsets a Logical Block Address to point to the Partition Boot Record corresponding to the starting sector of the first hard file partition;
        modifies the partition boot sector to refresh the physical parameters of the hard file emulated image;
        sets the number of hidden sectors in the BIOS Parameter Block to zero;
        sets the IPL drive in the BIOS Parameter Block to an emulated drive identification; and
        sets the IPL head in the BIOS Parameter Block to 00.

2. The data processing system of claim 1, wherein the BIOS includes programming to increase the number of root directory entries in the hard file image beyond that enabled by the operating system resident in the data processing system.

3. The data processing system of claim 1, wherein the non-volatile mass storage medium comprises a CD-ROM.

4. For a data processing system of a type comprising; a central processing unit (CPU), a system memory for storing data in the form of electrical signals, a first port for receiving an input device generating electrical input signals, at least one second port for supplying electrical output signals to output devices, a drive for a non-volatile mass storage medium storing multiple independent applications in the form of data on respective BIOS emulated images and a system bus interconnecting the CPU, system memory, first port and the at least one second port and mass storage medium driver:

a BIOS for carrying out prescribed functions including converting operating signals developed by an operating system executed by the CPU into electrical signals compatible with devices that are responsive to other signals applied by the CPU to the system bus, the BIOS including programming to emulate a hard file image as a diskette image including a starting sector of a first had file partition as a Partition Boot Record including a BIOS Parameter Block having physical parameters including a partition boot sector, hidden sectors, an IPL drive and an IPL head, wherein the BIOS programming: offsets a Logical Block Address to point to the Partition Boot Record corresponding to the starting sector of the first hard file partition; modifies the partition boot sector to force the operating system to refresh the physical parameters of the hard file emulated image; sets the number of hidden sectors in the BIOS Parameter Block to zero corresponding to that of a diskette; sets the IPL drive in the BIOS Parameter Block to an emulated drive identification; and sets the IPL head in the BIOS Parameter Block to 00.

5. The data processing system of claim 4, wherein the non-volatile mass storage medium comprises a CD-ROM.

6. A method of operating a data processing system comprising a central processing unit (CPU), input and output ports, a system memory for storing data in the form of electrical signals, a mass storage medium containing multiple bootable regions emulating at least one media image, a drive for writing data to and reading data from the mass storage medium and a system bus interconnecting the CPU, the input and output ports, the drive and the system memory, the CPU including a BIOS for carrying out prescribed functions including converting operating signals developed by an operating system executed by the CPU into electrical signals compatible with devices that are responsive to signals provided by the CPU to the system bus, the method comprising the steps at the BIOS level of emulating a hard file image as a diskette image, including offsetting a Logical Block Address to point to the Partition Boot Record corresponding to the starting sector of the first hard file partition, modifying the partition boot sector to force the operating system to refresh the physical parameters of the hard file image, setting the number of hidden sectors in the BIOS parameter block to zero corresponding to that of a diskette, setting the IPL drive in the BIOS Parameter Block to an emulated drive identification, and setting the IPL head in the BIOS Parameter Block to 00.

7. The method of claim 6, wherein the non-volatile mass storage medium comprises a CD-ROM.

* * * * *